UNITED STATES PATENT OFFICE.

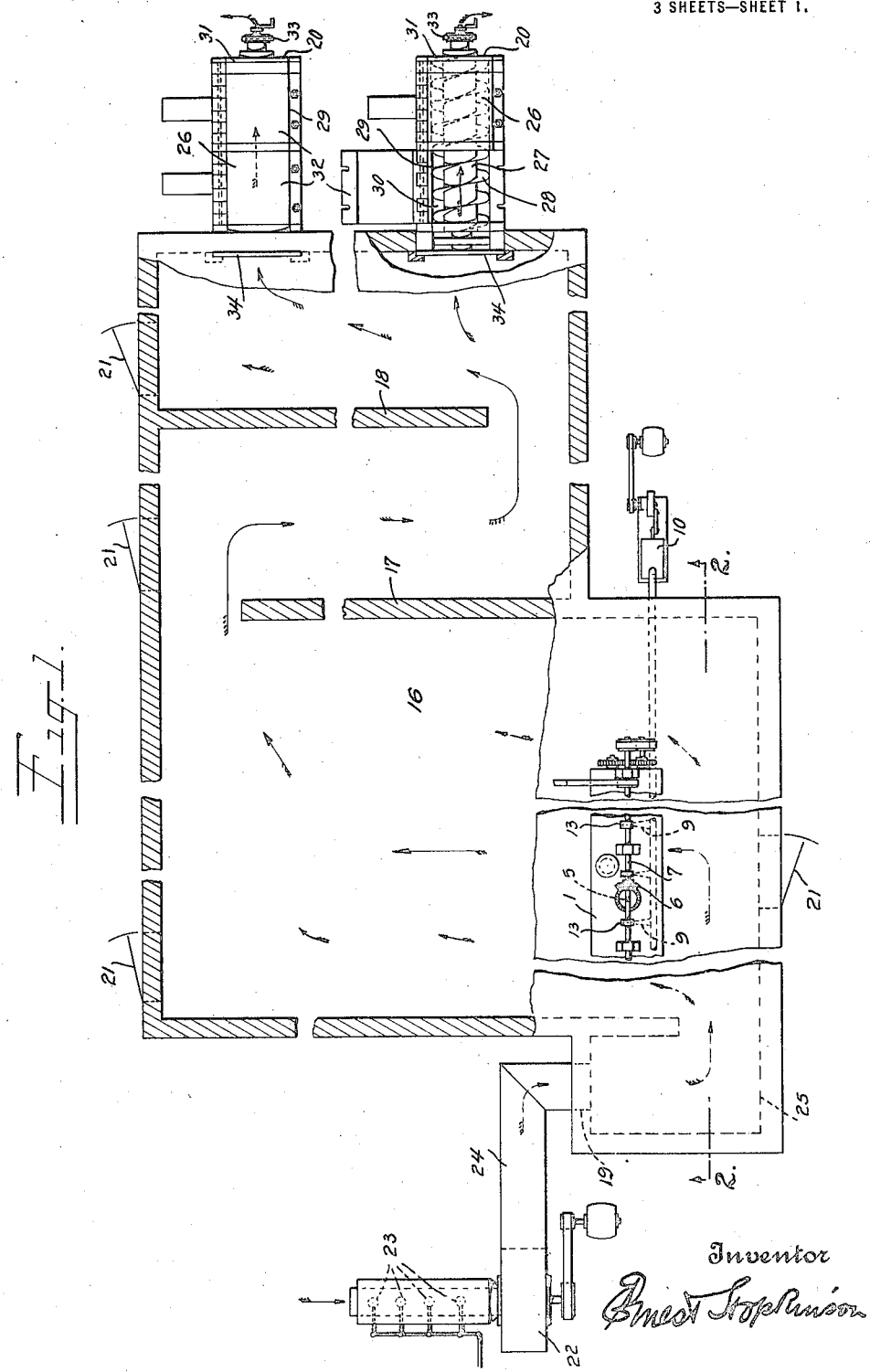

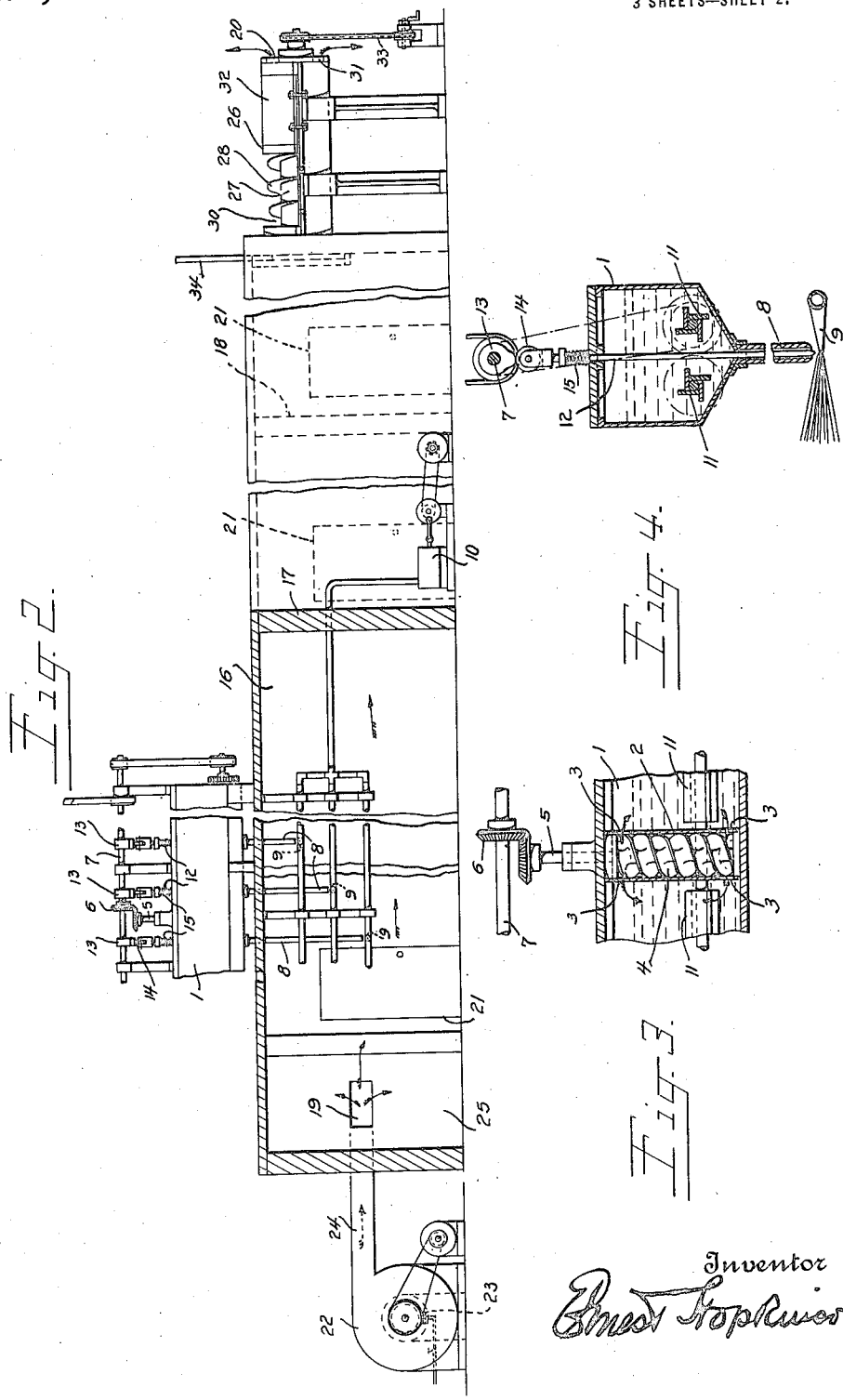

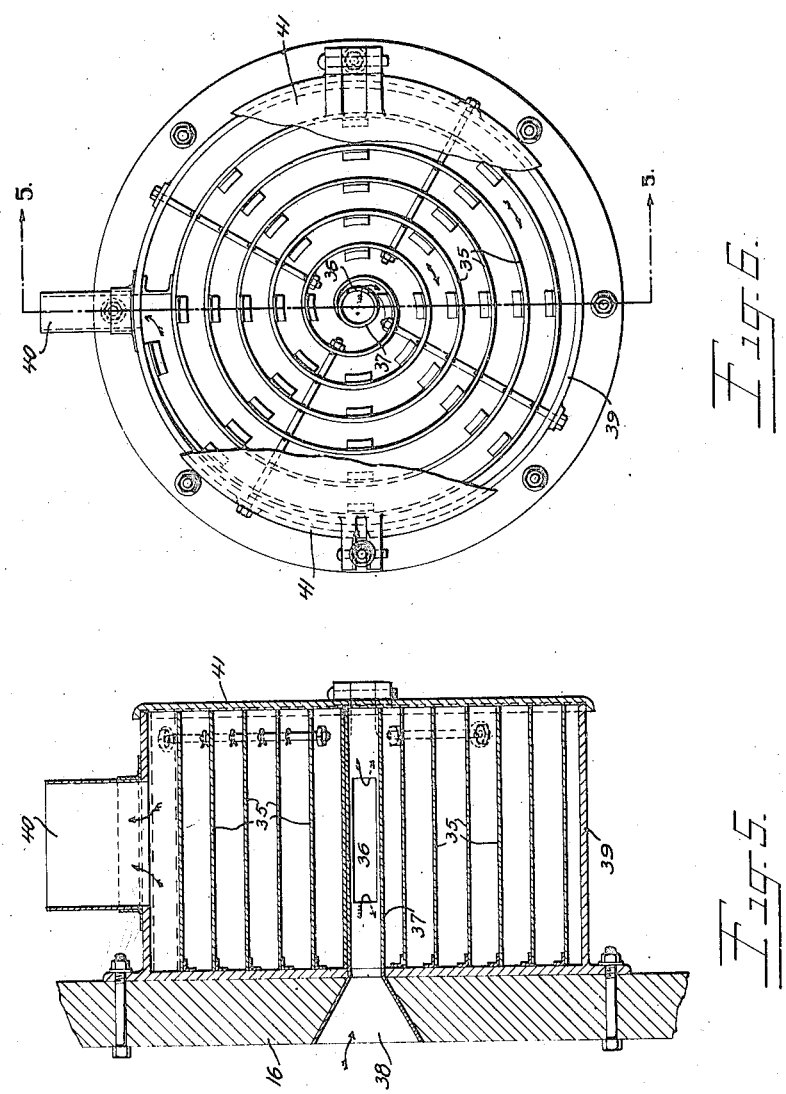

ERNEST HOPKINSON, OF NEW YORK, N. Y., ASSIGNOR TO GENERAL RUBBER COMPANY, A CORPORATION OF NEW JERSEY.

PROCESS FOR TREATING RUBBER-CONTAINING LATEX.

1,423,525.	Specification of Letters Patent.	Patented July 25, 1922.

Application filed January 16, 1920. Serial No. 351,945.

*To all whom it may concern:*

Be it known that I, ERNEST HOPKINSON, a citizen of the United States, residing at New York city, county and State of New York, have invented new and useful Improvements in Processes for Treating Rubber-Containing Latex, of which the following is a full, clear, and exact description.

This invention relates to processes for treating rubber-containing latex, and is more particularly directed to processes comprising the spraying of the latex.

By far the greater portion of rubber used at the present time is obtained from the latex of *Hevea brasiliensis*, this being the tree from which most of the rubber gathered on the Amazon and its tributaries is obtained, and is also the tree which is most exclusively cultivated in Ceylon, Federated Malay States, Straits Settlements, Sumatra and other parts of the East. At the present time all the rubber from this latex is coagulated. In Brazil the method consists of collecting the latex from the trees and immediately proceeding with the coagulation of the same, which is effected by dipping a paddle in the latex, and then holding the paddle with the layer of adhering latex over the smoke of a fire made of urucuri nuts, which give off fumes having astringent properties, thereby coagulating the latex. The paddle is repeatedly and alternately dipped and held over the fire, so that a mass of coagulated rubber is built up on it in layer formation. On the plantations in the East the process of coagulation consists of collecting the latex and immediately proceeding to the coagulation process by adding acetic acid or some similar chemical to the latex and stirring the same until a coagulum is formed, which consists of a spongy mass separated out of the latex and having generally the characteristics of curds separated from milk. Another process is to permit the latex to stand in a warm atmosphere, which brings about what is called natural coagulation. After the coagulum is formed, whether by the first or the second process, it is taken out of the residual fluid and passed through rolls to squeeze out the contained fluid, and is then dried, when it is then ready for shipment to the factories manufacturing rubber goods. In these processes just recited, in the case of the method employing smoke, used in South America, and in the case of the acetic acid coagulation, there are contained in the rubber finally obtained one or more chemical constituents (smoke products, acetic acid, etc.) which are undesirable and, to some extent, injurious. In all the processes just recited, it is impossible to obtain all the solid contents of the latex, and these solid contents are all of importance in the subsequent manipulation and vulcanization of the rubber obtained. The solid contents of the latex comprise the "caoutchouc" or rubber globules, resins and proteins, both soluble and insoluble in water.

One of the objects of the present invention accordingly, is to do away with the disadvantages above noted, and to provide a process which shall be efficient and economical, and in which the use of a coagulant such as smoke or similar material may be avoided. Another object is to provide a process in which the necessity for an after-treatment such as milling or otherwise to rid the sprayed product of residual moisture is avoided. Another object is to provide a process operable by unskilled labor which may be carried out with simple apparatus quickly and continuously. Another object is to provide a process in which a vulcanizing agent with or without compounding ingredients may be homogeneously incorporated in the product obtained. Another object of the invention is to provide a process which shall produce a rubber having improved physical characteristics, through the absence of milling or similar treatment, through the inclusion of protein substances ordinarily lost in the usual processes of coagulation, and where vulcanizing and compounding ingredients are employed, through the homogeneity of the resulting mass and the consequent improved ability of the mixed ingredients to react or otherwise perform their functions. Another object of the invention is to provide a process of the kind described which shall permit the addition of such vulcanizing or compounding ingredients to latex without its coagulation during the process, and a process which whether or not compounding ingredients are employed shall permit the transportation of latex to a distance from its source without coagulation.

These objects are secured, broadly speaking, by preventing the coagulation of the latex by the addition of basic material, preferably ammonia, and spraying the latex in a water-absorbing gaseous medium, such as heated air. By the present improvement all the solid contents of the rubber latex are obtained in the finished product, so that there is an increased yield from the latex of, roughly, three per cent based on the latex, or approximately ten per cent based on the rubber, the average latex containing solid constituents which vary, roughly, from about twenty-seven to forty per cent. Further, the solid contents of the latex are obtained by a process which drives off the water practically instantaneously, so that these solids undergo no chemical change and, moreover, as obtained, do not contain any added chemicals. It is true that others have suggested the spraying of rubber latex but, so far as I am aware, such spraying operations have always been used in connection with coagulating material, such as smoke or acetic acid or similar coagulating chemical. They have not had for their object the avoidance of chemical coagulation nor the object of obtaining the entire solid contents in the form and in the manner in which they are obtained by the present method. By the present method, not only is the yield increased, but the quality of the rubber obtained is materially improved, the tensile strength being increased by about twenty per cent, which may be attributed not only to the fact that there is present in the rubber all the solid contents of the latex, but also the fact that these solid contents have not been subjected to any milling operation as part of the coagulating process.

This application corresponds to co-pending application Serial Number 351,946, filed January 16, 1920.

This application is a continuation in part of application Serial No. 326,276, filed September 25, 1919.

A convenient form of apparatus in which the invention can be carried out is shown in the drawings hereto attached in which, Fig. 1 represents a partially sectioned plan view of the apparatus, portions of the chamber wall being removed in order that the remaining parts of the apparatus may be shown in relatively large size;

Fig. 2 is a sectional elevation taken on the line II—II of Fig. 1;

Fig. 3 is a fragmentary detail view of the agitator for stirring the latex in its tank.

Fig. 4 is a cross-sectional view of the tank showing the means for preventing obstruction of the delivery orifice adjacent the air nozzle;

Fig. 5 is a cross-sectional elevation of a modification of the spiral collector shown in Figs. 1 and 2, taken on the line 5—5; and Fig. 6 is an end elevation thereof.

Referring now more particularly to the drawings, the numeral 1 indicates a tank adapted to contain latex or similar material in which is disposed a vertical agitating device which comprises a vertical tube 2 extending from top to bottom of the tank and provided with orifices 3 adjacent the top and bottom. Within the tube is a worm 4 mounted on a shaft 5 adapted to be driven by bevel gear 6 from an outside source of power through a shaft 7. Extending from the bottom of the tank is a series of pipes 8 whose delivery orifices are stepped with respect to one another and terminate adjacent a series of nozzles 9 through which is forced compressed air from a compressor 10.

The vertical agitator 4 serves to provide a motion of the materials contained in the tank as indicated by the arrows, providing a continuous discharge from the top of the tube 2. Horizontal agitators 11 extending throughout the length of the tank are broken away as shown more clearly in Figs. 3 and 4 to permit passage of the vertical agitator therepast. They are driven from the shaft 7 through a belt and pulley device. The purpose of the agitators is to provide a uniform mixture of latex and any added ingredients as sulphur, etc. to the spraying device.

Referring to the detail view shown in Fig. 4 each of the pipes 8 is provided with a vertical plunger 12 of slightly smaller diameter than the interior diameter of the pipe and adapted to reciprocate therein to prevent accumulation of latex about the orifice with consequent stoppage. The plunger is reciprocated by means of a cam 13 mounted on the shaft 7 coacting through a roller 14 mounted on the end of the plunger projecting through the top wall of the tank. A spring 15 serves to keep the plunger normally withdrawn from the orifice of the pipe 8.

The tank 1 is mounted on top of the chamber 16. This chamber provides a devious path as shown by the arrows, caused by a series of partitions 17 and 18 which may comprise any desired number. The chamber shown is generally rectangular in outline, although any desired shape may be employed. The chamber is sealed, and in operation is closed throughout with the exception of the entrance for heated air 19 and the exits 20 in which latter are located spiral baffle members to be hereinafter described. Doors 21 may be disposed conveniently at various parts of the chamber to permit entrance and collection of material or for other desired purposes.

Through the entrance 19 air or an inert gas, as carbon dioxide, etc., driven by a blower 22 and heated by a series of gas flames 23 or by any other desired means is driven. The air from the blower proceeds through a conduit 24 into a vestibule 25 of the chamber and thence passes toward the sprays and constitutes a stream of drying gas for drying the finely divided latex. The temperature of the air may be regulated by regulating the quantity of gas burned and the quantity of air passing. Regulation of the volume of air for this purpose or for any other desired purpose may be accomplished by varying the speed of the blower.

The air after passing by the sprays follows the devious course heretofore indicated and during such passage a large proportion of the solid particles of the latex are precipitated. To secure those particles which are still moving under the action of the heated current, a series of spiral baffles disposed in a series of open ended cylinders 26 is provided. A number of such baffles and cylinders may be arranged each communicating with an exit orifice 20, and a description of one will suffice for all. Each spiral baffle comprises a cylindrical body portion 27 about which passes a helical flange 28. The diameter of the helical flanges is such that their extremities fit tightly against the inner cylindrical wall 29 of the chamber 26 and between successive flanges is provided thus a spiral channel 30 which preferably is relatively small in cross-section compared with the cross-section of the chamber 26. As herein shown, the depth of this channel is approximately one-fourth of the diameter of the chamber and its width is a little greater than its depth. Of course these dimensions may be varied in accordance with the various other elements in the design of the apparatus. The channel here shown has proven satisfactory in eliminating from the air current the remaining solid particles of the latex. This removal is effected by the centrifugal action which serves effectively to precipitate such remaining solid particles and consequently the air issuing from the exit 31 which is the outer open end of the drum 26 is substantially free therefrom.

In order that material arrested by the helical baffle may be satisfactorily collected, the chamber 26 is provided with hinged doors 32 here shown as constituting semi-circular segments of the cylinder, which may be thrown backwardly as shown in Fig. 1 so as to expose the entire inner surface of the cylinder. When this has been accomplished, the material may be scraped from the interior by rotation of the baffle which is mounted for rotation at one end by a bearing adjacent the center of the orifice 20 supported by the walls of the chamber 16 and the other end being supported by a bearing in the outer end of the chamber 26. A stud projecting from the outer end of the cylindrical portion 27 is provided with a sprocket and chain drive 33 adapted to be rotated by hand. It is contemplated that the collection of material from these collectors shall be operated intermittently in order that the process may be carried out continuously, and accordingly slide doors 34 are provided in order that one or more of the chambers 26 may be isolated while the remaining are in operation.

It will be observed that the form of the chamber 26 is here shown as cylindrical though it will be understood that it may be of any desired shape. The helix formed by the flange is also shown as of uniform diameter but it is pointed out that the helix may be tapered if desired. It will also be understood that although the helical baffle is here shown as rotating in fixed position, it may be arranged to move backwards and forwards if desired and in this case if preferred, the doors 32 may be eliminated, collected material being projected from the end of the chamber 26.

Referring now more particularly to the showing in Figs. 5 and 6 of the modified form of collector, an Archimedes spiral 35 is provided whose innermost coil is adjacent an opening 36 formed in a substantially cylindrical tube 37 having a communication with the chamber 16 through an orifice 38. An outer cylindrical casing 39 enclosing the spiral is provided and in the upper portion of the periphery thereof is an exit 40. For collection of material arrested by the spiral the swinging door 41 hinged to the casing 39 is provided. In a collection of solid particles by means of this collector, the air current conveys such particles in a spiral path thus permitting their arrest through centrifugal action against the walls of the spiral 35. The moisture laden conveying gas freed from such particles then passes through the exit 40. It will be understood that the description given above for one of these spirals may be applied equally to a series corresponding to that mentioned in connection with the spirals located in the chambers 36, or if desired, spirals of both types may be employed constituting such a series. After precipitation of the solid particles, the door 41 may be swung back and particles collected by scraping or brushing them from the spiral.

In carrying out the process, rubber-containing latex or similar material is treated upon collection of the latex from the trees with a preservative material adapted to prevent coagulation. Where only spontaneous coagulation which normally occurs upon standing of the latex is to be prevented, ammonia or similar substances alone may be added. If coagulation, induced by addition of substances such as vulcanizing agents or other compounding ingredients, particularly adsorptive substances, is to be prevented, saponin, glycerine or glue or similar material may be added. Such material should be preferably mixed with the vulcanizing agent or compounding ingredient before addition thereof to the latex. For prevention of spontaneous coagulation, 0.1% of ammonia may be added to the latex. To prevent coagulation by vulcanizing agents and other compounding ingredients, 0.1% of saponin may be added.

The latex and ammonia or latex and vulcanizing and compounding ingredients plus saponin are placed in a tank 1 and constantly agitated. While undergoing agitation, the latex is delivered in a uniform stream to an air jet 9 and projected in a stream of finely divided particles. The spray delivers the finely atomized material into a chamber 16 and the spray of atomized latex meets a second stream of drying gas, preferably heated air although any other gas such as carbon dioxide or the gaseous products of combustion, may be employed. The gas is heated preferably approximately to 200° F. and if heated air is employed, the humidity may be that of the atmosphere. The air serves as a drying and conveying medium for the fine particles passing from the sprays, and its temperature drops upon being joined by the stream of latex from approximately 200° F. to approximately 130° F. Higher temperatures than 200° F. may be employed if desired. Temperatures of 600° F. and higher have been satisfactorily used. The air absorbs moisture from the latex, its own humidity increasing to approximately the extent of the absorption. Deposition of the heated sprayed particles, which are dried by the action of the drying gas, from the stream of moistened heated air, begins to occur in appreciable quantity at the first abrupt changing of the gas stream, that is when the stream turns about the partition 17. The deposition continues while the mixture is being guided through a tortuous channel formed by partitions 17 and 18. The deposition of the particles is finally completely effected in the spiral collectors 26 and 27, the separation therein being effected by centrifugal action throwing the mass of particles to the surrounding walls of these chambers.

The fluid content of the latex may be altered to any desired extent by spraying. If desired, a rubber or similar material may be obtained containing 0.6% moisture or less. Rubber containing a small content of moisture as 0.6% so produced, appears within the chamber or other collecting area as a flocculent fluffy mass resembling in appearance bits of cotton waste. These particles tend to cohere, and when taken from the chamber appear in lumps of varying sizes. The following description is given of a product from latex obtained from *Hevea brasiliensis*, grown in Sumatra, Dutch East Indies, and treated with ammonia to prevent spontaneous coagulation.

The product is an unvulcanized spongy mass of rubber consisting of cohering particles and is white in color. It may be readily broken apart with the fingers. Upon being squeezed in the hand the sensation is similar to that arising when snow is similarly compacted. As collected from the chamber, the gravimetric density has been found to be 0.30–0.40 at 70° F.

The term "spongy" as employed in the specification and claims is intended to designate a porous compressible structure having an imbibitory character, but differing in its elasticity from that of an ordinary vegetable sponge which when compressed tends to return to its original structure, preserving its pores, while the sponge obtained by the present process loses its pores upon compression and consolidates. The pressed mass of the present process, as pointed out below, assumes the usual physical properties of crude rubber in a superior degree.

In order to form this spongy product into a crude rubber mass, it is placed in a hydraulic or other press or passed between pressure rolls and compacted. The air cavities thereupon disappear, the particles cohering and assuming the general characteristics of crude rubber. Of course this compacting process need not be a separate step solely for the purpose of compacting, as it will be obvious that this compacting may be effected in any necessary milling or calendering operation incident to the manufacture of vulcanized rubber articles; or the compacting, in some cases, may be effected in the pressure mold.

The compression of this spongy product effects its change into crude rubber. As pointed out, the spongy mass may be readily broken apart by the fingers, and aside from the fact that upon addition of water thereto a return to substantially the form of latex does not occur, the material differs from the ordinary form of coagulum obtained by spontaneous coagulation. Two theories appear as to the actual change which occurs in this cheese-like mass upon compression. One theory conceives that the mass consists of particles of rubber surrounded by protein masses, which upon compression or rolling are exposed through breaks in the protein envelopes, permitting the particles of rubber to adhere to one another. The other theory assumes that the spongy mass represents rubber in a low state of polymerization, and that compression or rolling results in the appearance of a higher polymerization to produce crude rubber.

The crude rubber thus formed differs from ordinary crude rubber formed by the usual process of acetic acid or other coagulation with milling, washing, etc., in that under the microscope instead of the somewhat striated structure ordinarily found in crude rubber, a globular structure appears. In its chemical constitution it also differs from ordinary crude rubber in that it contains a higher percentage of protein matter and in that the character of these components in general is changed. The following approximate analysis of similar rubbers, both obtained from the latex of *Hevea brasiliensis* grown in Sumatra, Dutch East Indies, will serve as a specific example of the differences noted. These differences may vary in accordance with variations in condition of growth and time of collection of latex, but the table below presented represents a comparison of rubbers obtained from similar latexes:—

| Rubbers. | Moisture. | Acetone extract. | Ash. | Water extract. | Protein. | Acidity as acetic acid. |
|---|---|---|---|---|---|---|
| Ordinary milled rubber. | Under 1.0 % | 3.0 % | 0.4 % | 0.3 % | 2.0 % | 0.02 % |
| Sprayed in air | Under 1.0 | 5.20 | 1.50 | 7.2 | 4.2 | 0.10 |

It will be observed that the acetone extract, ash, water extract, percent of protein, are all substantially increased. In this connection it is pointed out that by spraying in accordance with the procedure outlined, a product is obtained in which substantially all of the solid constituents of the latex are preserved, the only loss being the fluid portion which is practically entirely water, and in the case of ammonia treated latex, ammonia is of course lost in the spraying operation. Rubbers obtained from latex by spraying may vary in their moisture content. These rubbers have a neutral or alkaline reaction as opposed to the acid reaction of ordinary crude rubber.

One of the chief differences in the character of sprayed crude rubber when compared with ordinary crude rubber appears upon vulcanization. When the material is milled with sulphur, an increase in tensile strength and resistance to abrasion of approximately 20% occurs. Such increase in tensile strength is shown in connection with the following example of rubber mixes in which the following ingredients were employed.

A. *Coagulated and milled.*

Rubber, 100 parts.
Zinc oxide, 150 parts.
Sulphur, 10 parts.
Tensile strength, 2000 lbs. per sq. in.
Vulcanization at 40 lbs. steam pressure for 2 hours.

B. *Sprayed.*

Rubber, 100 parts.
Zinc oxide, 150 parts.
Sulphur, 10 parts.
Tensile strength, 3100 lbs. per sq. in.
Vulcanization at 40 lbs. steam pressure for 2 hours, When vulcanizing and other compounding ingredients are mixed with latex, preferably in the presence of saponin, and then sprayed, the resistance to abrasion and tensile strength noted above upon comparison with ordinary crude rubber is found to be even more greatly improved than where the vulcanizing and other compounding ingredients are introduced, as in the case of the sprayed rubber in the above table, by milling. Such increase is probably due to the absence of such milling operation which tends to break down the rubber as is well known, and also the increase in the homogeneity of the mass, which is apparent upon examination under the microscope. The presence of the increased quantity of protein in the sprayed rubber aids in accelerating vulcanization whether the vulcanizing ingredients be added before or after spraying. It will be observed that various types of vulcanizing ingredients such as sulphur heretofore mentioned, the nitro compounds, sulphur compounds, such as hydrogen sulphide and sulphur dioxide, may be employed in connection with latex, being applied preferably before spraying in order that the homogeneity of the mass may be improved and milling avoided although they may be added at any desired time. As pointed out, other compounding ingredients such as carbon black, gas black, zinc oxide, and other materials, may be added before or after spraying, preferably before spraying. In some cases the latex may be sprayed and the powdered vulcanizing and compounding ingredients blown separately into the latex spray. The ordinary processes of vulcanization may be employed in connection with the material.

It will be observed that the process set forth is preferably carried out without employment of an artificial coagulant such as acetic acid, alcohol, smoke, or the like, and the product is consequently free from such foreign substances. The avoidance of the addition of a coagulant also reduces the expense of the operation and elimination of the necessity for further moisture removal after spraying makes unnecessary the handling of the rubber and its weakening by milling or heating.

It will thus be seen that among others the objects heretofore enumerated are achieved.

As many apparently widely different embodiments of this invention could be made without departing from the spirit thereof, it will be understood that I do not intend to limit myself to the specific embodiment herein set forth except as indicated in the appended claims.

By latex or similar material as used in the claims is meant the juices of plants producing rubber, balata or gutta percha.

Having thus described my invention, what I claim and desire to protect by Letters Patent is:

1. A process for treating latex or similar material which comprises subjecting finely divided latex to a drying gas, withdrawing moisture from the latex, precipitating solid particles of latex and compacting the particles.

2. A process for treating latex or similar material which comprises subjecting finely divided latex to a heated gas, withdrawing moisture from the latex, precipitating dried solid particles of latex and compacting the particles.

3. A process for treating latex or similar material which comprises subjecting sprayed latex to a heated drying gas, withdrawing moisture from the latex, precipitating the solid particles of the latex and compacting the particles.

4. A process for treating latex or similar material which comprises projecting sprayed latex into a stream of heated air, withdrawing moisture from the latex, precipitating the solid particles of latex from the stream and pressing the particles.

5. A process for treating latex or similar material which comprises projecting a stream of sprayed latex into a stream of air heated to a temperature of approximately 200° F., withdrawing moisture from the latex, precipitating the solid particles of latex from the combined streams and pressing the particles to form crude rubber.

6. A process for treating latex or similar material which comprises adding a vulcanizing agent and a protective agent to latex, changing the latex, vulcanizing agent and protective agent into a finely divided form, and reducing the fluid content of the latex while in finely divided form.

7. A process for treating latex or similar material which comprises adding a vulcanizing agent and a protective agent to latex, spraying the latex, vulcanizing agent and protective agent and removing moisture from the sprayed latex.

8. A process for treating latex or similar material which comprises adding a protective agent to latex adapted to prevent coagulation thereof, projecting finely divided latex and protective agent into a drying gas, precipitating the solid particles of latex and compacting the particles to form crude rubber.

9. A process for treating latex or similar material which comprises adding a protective agent to latex adapted to prevent coagulation thereof, projecting sprayed latex into a stream of heated drying gas, precipitating the solid particles of latex from the combined streams and pressing the particles to form crude rubber.

10. A process for treating latex or similar material which comprises adding saponin to latex, projecting a stream of finely divided latex and saponin into a second stream of drying gas, precipitating the solid particles of latex from the stream and compacting the particles to form crude rubber.

11. A process for treating latex or similar material which comprises adding a vulcanizing agent to latex, changing the latex and vulcanizing agent into a finely divided form, and reducing the fluid content of the latex while in finely divided form.

12. A process for treating latex or similar material which comprises adding a vulcanizing agent to latex, spraying the latex and vulcanizing agent, and removing moisture from the sprayed latex.

13. A process for treating latex or similar material which comprises adding sulphur to latex, spraying the latex and sulphur, and removing moisture from the sprayed latex.

14. A process for treating latex or similar material which comprises adding a vulcanizing agent to latex, projecting the finely divided latex and vulcanizing agent into a drying gas, precipitating solid particles therefrom and compacting the particles to form crude rubber.

15. A process for treating latex or similar material which comprises adding a vulcanizing agent to latex, projecting sprayed latex and the vulcanizing agent into a heated gas, precipitating dried solid particles therefrom and compacting the particles to form crude rubber.

16. A process for treating latex or similar material which comprises adding a vulcanizing agent and a compounding ingredient to latex, projecting finely divided latex, the vulcanizing agent and compounding ingredient into a drying gas, precipitating solid particles therefrom and compacting the particles to form crude rubber.

17. A process for treating latex or similar material which comprises adding to latex a vulcanizing agent normally acting to precipitate the same and a protective agent adapted to prevent such precipitation, projecting the said mixture in a finely divided condition into a drying gas, precipitating solid particles therefrom and compacting the particles to form crude rubber.

18. A process for treating latex or similar material which comprises adding a vulcanizing agent tending to precipitate latex and saponin to latex, projecting a stream of sprayed latex, the vulcanizing agent and saponin into a second stream of heated gas, precipitating solid particles from the combined streams and compacting the particles to form crude rubber.

19. A process for treating latex or similar material which comprises adding a vulcanizing agent and a compounding ingredient adapted to precipitate latex to latex and a protective agent adapted to prevent such precipitation, projecting a stream of finely divided latex, vulcanizing agent, compounding ingredient and protective agent into a second stream of drying gas, precipitating solid particles from the combined streams and compacting the particles to form crude rubber.

20. A process for treating latex or similar material which comprises adding sulphur, an adsorptive compounding ingredient to latex and a protective agent adapted to prevent precipitation of the latex by said adsorptive ingredient, projecting a stream of finely divided latex, sulphur, adsorptive agent and protective agent into a second stream of drying gas, precipitating solid particles from the combined streams and compacting the particles to form crude rubber.

21. A process for treating latex or similar material which comprises adding sulphur, compounding ingredient adapted to precipitate latex and saponin to latex, projecting a stream of sprayed latex, sulphur, compounding ingredient and saponin into a second stream of heated air, precipitating solid particles from the combined streams and compacting the particles to from crude rubber.

22. A process for treating latex or similar material which comprises subjecting finely divided latex to a drying gas until dry, and compacting the so-treated latex.

23. A process for treating latex or similar material which comprises subjecting sprayed latex to a heated drying gas until dry, and compacting the so-treated latex.

24. A process for treating latex or similar material which comprises projecting a stream of sprayed latex into a second stream of air heated to a temperature of approximately 200° F. until dry, precipitating dried solid particles of latex from the combined streams, and compressing the particles to form crude rubber.

25. A process for treating latex or similar material which comprises changing latex into a finely divided form, withdrawing moisture from the latex, and recovering substantially all of the solid contents of the latex.

26. A process for treating latex or similar material which comprises subjecting finely divided latex to a drying gas, carrying the solid contents of the latex along in the drying gas until dry, and recovering substantially all of the solid contents of the latex.

27. A process for treating latex or similar material which comprises projecting sprayed latex into a stream of heated drying gas until dry, deflecting the course of the current of the drying gas and the particles of latex therein, and precipitating and recovering substantially all of the solid contents of the latex.

28. A process for treating latex or similar material which comprises projecting sprayed latex into a stream of heated drying gas until dry, deflecting the course of the current of the drying gas and the particles of latex therein, precipitating and recovering substantially all of the solid contents of the latex, and compressing the latex so produced to form crude rubber.

29. A step in the process for treating latex or similar material which comprises forming a substantially dry unvulcanized spongy mass of rubber consisting of cohering particles.

30. A step in the process for treating latex or similar material which comprises spraying latex into a gaseous drying medium forming a substantially dry rubber.

31. A process for treating latex or similar material which comprises combining latex with a substance tending to coagulate the latex in the presence of a protective agent adapted to oppose such coagulation, and recovering the combination of rubber and said substance.

32. A process for treating latex or similar material which comprises combining latex with a substance tending to coagulate the latex in the presence of glue, and recovering the combination of rubber and said substance.

33. The herein described process which comprises spraying latex into a gaseous drying medium, and precipitating dried particles of rubber.

Signed at New York city, New York, this 15th day of January, 1920.

ERNEST HOPKINSON.